(12) United States Patent
Steingrube

(10) Patent No.: US 8,327,470 B2
(45) Date of Patent: Dec. 11, 2012

(54) MULTILAYER MATERIAL WEB, ESPECIALLY FOR SAFETY SUITS

(75) Inventor: Kim Sascha Steingrube, Steinhorst (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 210 days.

(21) Appl. No.: 12/480,049

(22) Filed: Jun. 8, 2009

(65) Prior Publication Data

US 2010/0024102 A1     Feb. 4, 2010

(30) Foreign Application Priority Data

Jul. 29, 2008    (DE) .................. 10 2008 035 351

(51) Int. Cl.
*A62D 5/00* (2006.01)
*A41D 27/02* (2006.01)
*A41D 13/00* (2006.01)

(52) U.S. Cl. ............... 2/458; 2/456; 2/457; 2/69; 2/79; 2/272

(58) Field of Classification Search .............. 2/455, 456, 2/457, 458, 69, 79, 81, 82, 97, 272, 904, 2/901
See application file for complete search history.

(56) References Cited

U.S. PATENT DOCUMENTS

| | | | |
|---|---|---|---|
| 4,675,228 A | 6/1987 | Little | |
| 4,770,927 A | 9/1988 | Effenberger et al. | |
| 4,816,328 A | 3/1989 | Saville et al. | |
| 4,943,473 A | 7/1990 | Sahatjian et al. | |
| 5,050,241 A * | 9/1991 | Flowers et al. | 2/457 |
| 5,082,721 A * | 1/1992 | Smith et al. | 442/289 |
| 5,236,769 A * | 8/1993 | Paire | 428/196 |
| 5,264,276 A * | 11/1993 | McGregor et al. | 442/289 |
| 5,492,753 A * | 2/1996 | Levy et al. | 428/219 |
| 5,640,718 A | 6/1997 | Aldridge | 2/81 |
| 5,743,775 A * | 4/1998 | Baurmeister | 442/77 |
| 5,920,905 A | 7/1999 | Aldridge | 2/81 |
| 6,040,251 A * | 3/2000 | Caldwell | 442/123 |
| 6,308,344 B1 * | 10/2001 | Spink | 2/458 |
| 6,341,384 B1 * | 1/2002 | Hayes | 2/458 |
| 6,691,317 B2 * | 2/2004 | Cochran | 2/97 |
| 6,743,498 B2 * | 6/2004 | Fourmeux | 428/131 |
| 6,841,791 B2 * | 1/2005 | DeMeo et al. | 250/515.1 |
| 7,597,855 B2 * | 10/2009 | Trentacosta et al. | 422/119 |
| 2001/0055631 A1* | 12/2001 | Thompson et al. | 425/363 |
| 2004/0006815 A1* | 1/2004 | Carroll et al. | 2/457 |
| 2004/0058603 A1* | 3/2004 | Hayes | 442/286 |

(Continued)

FOREIGN PATENT DOCUMENTS

DE     38 80 643 T2    11/1993

(Continued)

*Primary Examiner* — Bobby Muromoto, Jr.
(74) *Attorney, Agent, or Firm* — McGlew and Tuttle, P.C.

(57) ABSTRACT

A material structure is provided with a multilayer material web (1) for forming flexible safety suits, containers, tarpaulins and tents. The material structure and products formed therefrom offers both high mechanical and chemical safety and makes it at the same time possible to greatly simplify both the manufacture of the material structure itself and the manufacture of chemical safety suits or other products with the desired properties and thus to make it less expensive. The multilayer material web (1) includes a fabric layer (2), a PTFE layer (3) applied on one side of the fabric layer (2) and a layer of a flameproof and flame-retardant material (5) applied on the other side of the fabric layer (2).

18 Claims, 1 Drawing Sheet

U.S. PATENT DOCUMENTS

| | | | |
|---|---|---|---|
| 2005/0050619 A1* | 3/2005 | Dunn | 2/458 |
| 2007/0124849 A1* | 6/2007 | Williams et al. | 2/275 |
| 2007/0289050 A1* | 12/2007 | Nocente et al. | 2/458 |
| 2008/0189840 A1* | 8/2008 | Knoff et al. | 2/458 |
| 2008/0227896 A9* | 9/2008 | Ebeling et al. | 524/115 |
| 2008/0289088 A1* | 11/2008 | Howard, Jr. | 2/457 |
| 2009/0205116 A1* | 8/2009 | Stone et al. | 2/455 |
| 2009/0222980 A1* | 9/2009 | Klug et al. | 2/455 |
| 2009/0249531 A1* | 10/2009 | Kruszewski et al. | 2/458 |
| 2009/0255039 A1* | 10/2009 | Danielsson | 2/458 |
| 2009/0300832 A1* | 12/2009 | Howard, Jr. | 2/457 |
| 2009/0300833 A1* | 12/2009 | Kampert et al. | 2/458 |

FOREIGN PATENT DOCUMENTS

| | | |
|---|---|---|
| DE | 694 26 397 T2 | 7/2001 |
| DE | 101 33 787 A1 | 2/2003 |
| EP | 0 668 823 | 8/1995 |
| EP | 1629972 A1 | 3/2006 |
| WO | 03074269 A1 | 9/2003 |
| WO | WO 2008/058732 A2 | 5/2008 |

* cited by examiner

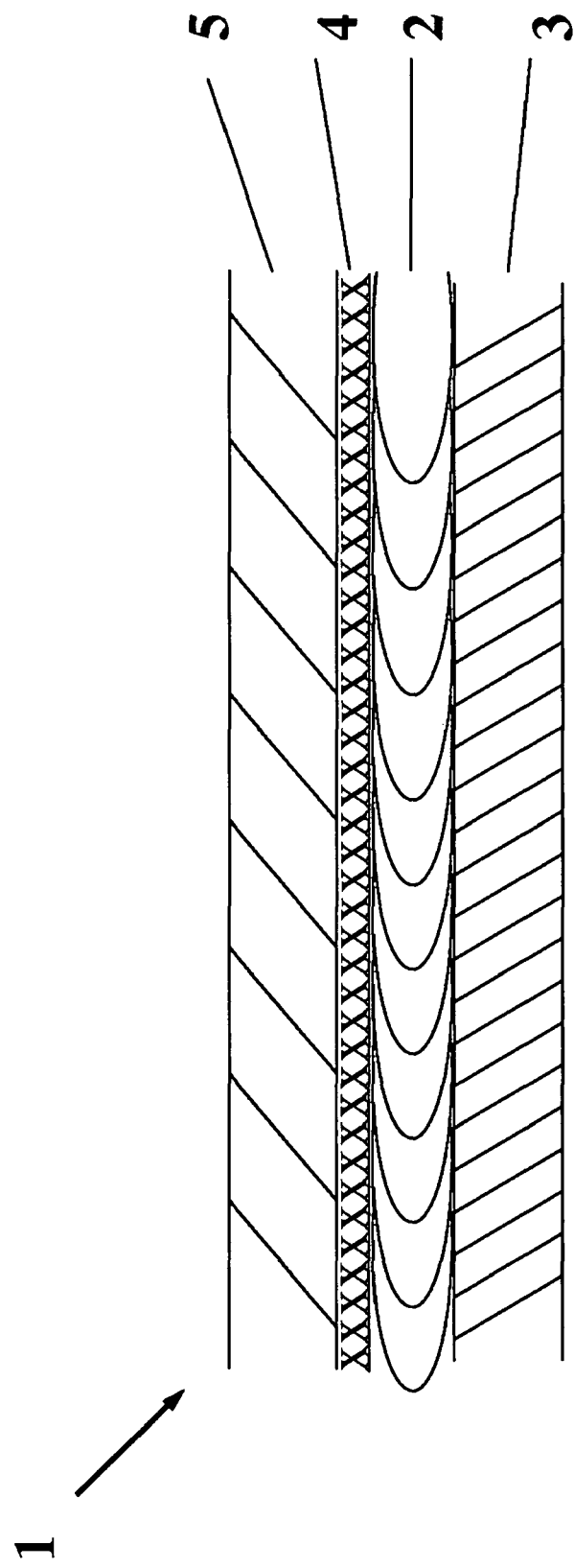

MULTILAYER MATERIAL WEB, ESPECIALLY FOR SAFETY SUITS

CROSS REFERENCE TO RELATED APPLICATIONS

This application claims the benefit of priority under 35 U.S.C. §119 of German Patent Application DE 10 2008 035 351.5 filed Jul. 29, 2008, the entire contents of which are incorporated herein by reference.

FIELD OF THE INVENTION

The present invention pertains to a multilayer material web for forming flexible safety suits, containers, tarpaulins and tents, wherein the material web is resistant to permeation. In particular, the material web according to the present invention is intended for manufacturing chemical safety suits.

BACKGROUND OF THE INVENTION

Gas-tight material webs, which are suitable especially for manufacturing gas-tight safety suits or chemical safety suits, are manufactured by fabricating coated fabrics, which are cut and sewn as in the clothing industry. The seams inevitably formed in the manufacturing process must be reclosed gas-tightly. Since safety suit materials that do not permit direct closing due to their structure have hitherto been used, the seams must be closed in an additional operation by applying a separate tape. These tapes were applied by bonding in the past, but a process called welding was alternatively developed recently, in which a thermoplastic polymer is brought to the seam location by two rollers by means of hot air and pressure and connected to the surface of the suit by vulcanization.

Since both the inside and the outside of the seams must be welded in this manner up to now, this process is very complicated and therefore accounts for a large portion of the manufacturing costs. For example, about 80 running meters of welding tape must be processed per suit. The requirements imposed on the materials for gas-tight chemical safety suits or other products, which use these materials, are varied and high. Thus, a large number of chemical resistances and gas permeation resistances must be demonstrated. The mechanical strengths against, for example, abrasion also imposed high requirements on the material used.

To meet these various requirements, various solutions were proposed for the material structure in the form of a multilayer material web, in which one layer, which forms the outside, usually consists of a flameproof and flame-retardant or flame-resistant material. Besides an elastomer layer, a film is processed, which represents the chemical barrier layer proper. An additional elastomer layer, which is the layer that makes possible the welding process described in the first place, is used on the inside of the chemical safety suit. The incorporated fabric layer increases the tear and puncture resistance of the multilayer material.

A laminate for chemical safety suits consisting of a two-sided film made of polyvinyl fluoride (PVF) on a layer consisting of chlorinated polyethylene (CPE) is disclosed in U.S. Pat. No. 4,675,228.

A prior-art multilayer material web appears, for example, from EP 0 668 823 B1, where a plurality of rubber layers are combined. The manufacturing costs of these prior-art material webs according to EP 0 668 823 B1 are high for the following reasons: The elastomers are applied to the fabric-film composite prepared in advance by a coating process or calendering. To reach the layer thicknesses of the elastomer that are necessary for sufficient resistance, these elastomers must be manufactured by a plurality of coating or calendering operations, i.e., the roll web must be led through the corresponding plant several times.

SUMMARY OF THE INVENTION

The object of the present invention is to propose a material structure that offers both high chemical and mechanical safety and makes it possible at the same time to greatly simplify the manufacture of the material structure itself as well as of chemical safety suits or other products with the desired properties and thus to make it less expensive.

According to the invention a multilayer material web is provided for forming flexible safety suits, containers, tarpaulins, and tents. The material web comprises a fabric layer, a polytetrafluoroethylene (PTFE) layer applied on one side of the fabric layer and a layer of a flameproof and flame-retardant material applied on the other side of the fabric layer.

The flameproof and flame-retardant material may advantageously be a polychloroprene rubber applied by means of a bonding agent or contains polychloroprene rubber. The flameproof and flame-retardant material may be a flame-resistant composite film. Such a flame-resistant composite film comprises at least one of polytetrafluoroethylene (PTFE) and polyethylene terephthalate (PET) and a thermoplastic polyurethane.

The thermoplastic PTFE layer may advantageously have a layer thickness of 15 µm to 50 µm. The thermoplastic PTFE layer may advantageously be welded to the fabric layer.

The fabric layer may advantageously comprise at least one of polyamide (PA), polyethylene (PE) and an aramide fabric. The fabric may advantageously have a yarn density in the range of 230 dtex to 580 dtex.

According to another aspect of the invention, a chemical safety suit is provided comprising a multilayer material. The multilayer material comprises a fabric layer, a polytetrafluoroethylene (PTFE) layer applied on a first side of the fabric layer and a layer of a flameproof and flame-retardant material applied on an opposite second side of the fabric layer.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

BRIEF DESCRIPTION OF THE DRAWING

In the drawings:

The only FIGURE is a sectional view of an exemplary embodiment of the multilayer material according to the present invention.

DESCRIPTION OF THE PREFERRED EMBODIMENTS

Referring to the drawings in particular, a multilayer material web 1 according to the invention is based on a textile fabric in a fabric layer 2, which contains a polyamide (PA), polyethylene (PE) or aramide or consists of these as the carrier material.

The yarn density of the fabric of the fabric layer 2 is between 230 and 580 dtex.

A flameproof and flame-retardant material 5 is applied to the outside. The flameproof and flame-retardant material 5 is, for example, either a polychloroprene rubber (CR) applied by means of an adhesive or bonding agent 4 or a composite film consisting of polytetrafluoroethylene (PTFE) or polyethylene terephthalate (PET) and a thermoplastic polyurethane (TPU). The inside is always formed by a PTFE layer 3, the PTFE being modified such that it lends itself to thermoplastic processing. Such a PTFE material is available, for example, from the company ElringKlinger Kunststoffe (www.elringklinger-kunststoff.de) with the product name "Moldflon."

As a result, an extremely chemical-resistant PTFE layer 3 is welded to the fabric layer 2.

The PTFE layer 3 has a layer thickness of preferably 15 µm to 50 µm.

Since the thermoplastically processable PTFE layer 3 is a thermoplastic elastomer, this film can be used directly, i.e., without the addition of a welding tape for closing the seams in a gas-tight manner. The additional tapes that were hitherto necessary for sealing the seams of a chemical safety suit or similar products with comparable properties are thus eliminated with the new material structure being proposed. As a result, the manufacturing costs can therefore be reduced substantially.

In addition, there is an extreme improvement in the permeation resistance to chemicals, with the result that additional rubber/butyl layers can be eliminated.

Permeation measurements according to DIN ISO 6529 have revealed, for example, with respect to the permeation or passage through dichloromethane, that more than 3 times better results are obtained with the new multilayer material structure according to the invention than with the composite material according to EP 0 668 823 B1 used hitherto.

While specific embodiments of the invention have been shown and described in detail to illustrate the application of the principles of the invention, it will be understood that the invention may be embodied otherwise without departing from such principles.

What is claimed is:

1. A multilayer material web for forming flexible safety suits, containers, tarpaulins, and tents, the material web comprising:
a fabric layer;
a polytetrafluoroethylene (PTFE) layer applied on one side of the fabric layer, said polytetrafluoroethylene layer being heat-sealed with said fabric layer, said polytetrafluoroethylene layer being in direct contact with said one side of said fabric layer, said polytetrafluoroethylene layer defining a base of a seam structure of a safety suit; and
a layer of a flameproof and flame-retardant material applied on the other side of the fabric layer, said flame-retardant material being a polychloroprene rubber applied by means of a bonding agent.

2. A multilayer material web in accordance with claim 1, wherein said flameproof and flame-retardant material is connected with said other side of said fabric layer via said bonding agent, said bonding agent being in contact with said other side of said fabric layer and said layer of said flameproof and flame-retardant material, said layer of flameproof and flame-retardant material defining an outer layer of said seam structure of the safety suit.

3. A multilayer material web in accordance with claim 1, wherein the thermoplastic PTFE layer has a layer thickness of 15 µm to 50 µm.

4. A multilayer material web in accordance with claim 1, wherein the fabric layer comprises at least one of polyamide (PA), polyethylene (PE) and an aramide fabric.

5. A multilayer material web in accordance with claim 1, wherein the fabric has a yarn density in the range of 230 dtex to 580 dtex.

6. A chemical safety suit comprising:
a multilayer material safety suit seam structure comprising a fabric layer, a layer of polytetrafluoroethylene (PTFE) engaging a first side of the fabric layer and a layer of a flameproof and flame-retardant material applied on a second side of the fabric layer, wherein said layer of polytetrafluoroethylene is in direct contact with said first side of the fabric layer, said layer of polytetrafluoroethylene comprising a user engaging contact surface for contacting a portion of a user, said layer of polytetrafluoroethylene being heat-sealed with said fabric layer, said second side being opposite said first side, said layer of polytetrafluoroethylene defining a base layer of said multilayer safety suit seam structure, said flameproof and flame-retardant material being a polychloroprene rubber applied by means of a bonding agent.

7. A chemical safety suit in accordance with claim 6, wherein said polychloroprene rubber is connected to said fabric layer via said bonding agent, said bonding agent being in contact with said second side of said fabric layer and said layer of flameproof and flame-retardant material, said polychloroprene rubber defining an outer layer of said multilayer material safety suit seam structure.

8. A chemical safety suit in accordance with claim 6, wherein the thermoplastic PTFE layer has a layer thickness of 15 µm to 50 µm.

9. A chemical safety suit in accordance with claim 6, wherein the fabric layer comprises at least one of polyamide (PA), polyethylene (PE) and an aramide fabric.

10. A chemical safety suit in accordance with claim 6, wherein the fabric has a yarn density in the range of 230 dtex to 580 dtex.

11. A chemical safety suit comprising:
a chemical safety suit structure comprising a multilayer material safety suit seam structure, said multilayer material safety suit seam structure comprising a fabric layer, said fabric layer comprising an inner fabric side surface and an outer fabric side surface, said multilayer material safety suit seam structure further comprising a polytetrafluoroethylene layer having a fabric layer contact side surface and a user contact side surface, said user contact side surface defining an inner surface of said chemical safety suit structure for engaging at least a portion of a user of said chemical safety suit structure, said fabric layer contact side surface of said polytetrafluoroethylene layer being in direct contact with said inner fabric side surface, said polytetrafluoroethylene layer defining a bottom layer of said multilayer material safety suit seam structure, said multilayer material safety suit seam structure further comprising a layer of a flameproof and flame-retardant material, said layer of said flameproof and flame-retardant material having a flameproof and flame-retardant material outer surface and a flameproof and flame-retardant material inner surface, said flameproof and flame-retardant material inner surface being connected to said outer fabric side surface of said fabric layer, said layer of flameproof and flame-retardant material defining an outer surface of said chemical safety suit structure.

12. A chemical safety suit in accordance with claim 11, wherein the flameproof and flame-retardant material is a polychloroprene rubber, said fabric layer being heat-sealed with polytetrafluoroethylene layer, said layer of said flameproof and flame-retardant material defining a top layer of said multilayer material safety suit seam structure.

13. A chemical safety suit in accordance with claim 12, wherein said polychloroprene rubber is bonded to said outer fabric side surface via a bonding agent, said bonding agent being in contact with said outer fabric side surface and said flameproof and flame-retardant material.

14. A chemical safety suit in accordance with claim 13, wherein said fabric layer has a yarn density in a range of 230 dtex to 580 dtex.

15. A chemical safety suit in accordance with claim 11, wherein the flameproof and flame-retardant material is a flame-resistant composite film.

16. A chemical safety suit in accordance with claim 11, wherein said polytetrafluoroethylene layer has a layer thickness of 15 μm to 50 μm.

17. A chemical safety suit in accordance with claim 16, wherein said polytetrafluoroethylene layer is welded to said inner fabric side surface.

18. A chemical safety suit in accordance with claim 15, wherein said flame-resistant composite film comprises at least one of polytetrafluoroethylene and polyethylene terephthalate and a thermoplastic polyurethane.

* * * * *